United States Patent Office 3,320,075
Patented May 16, 1967

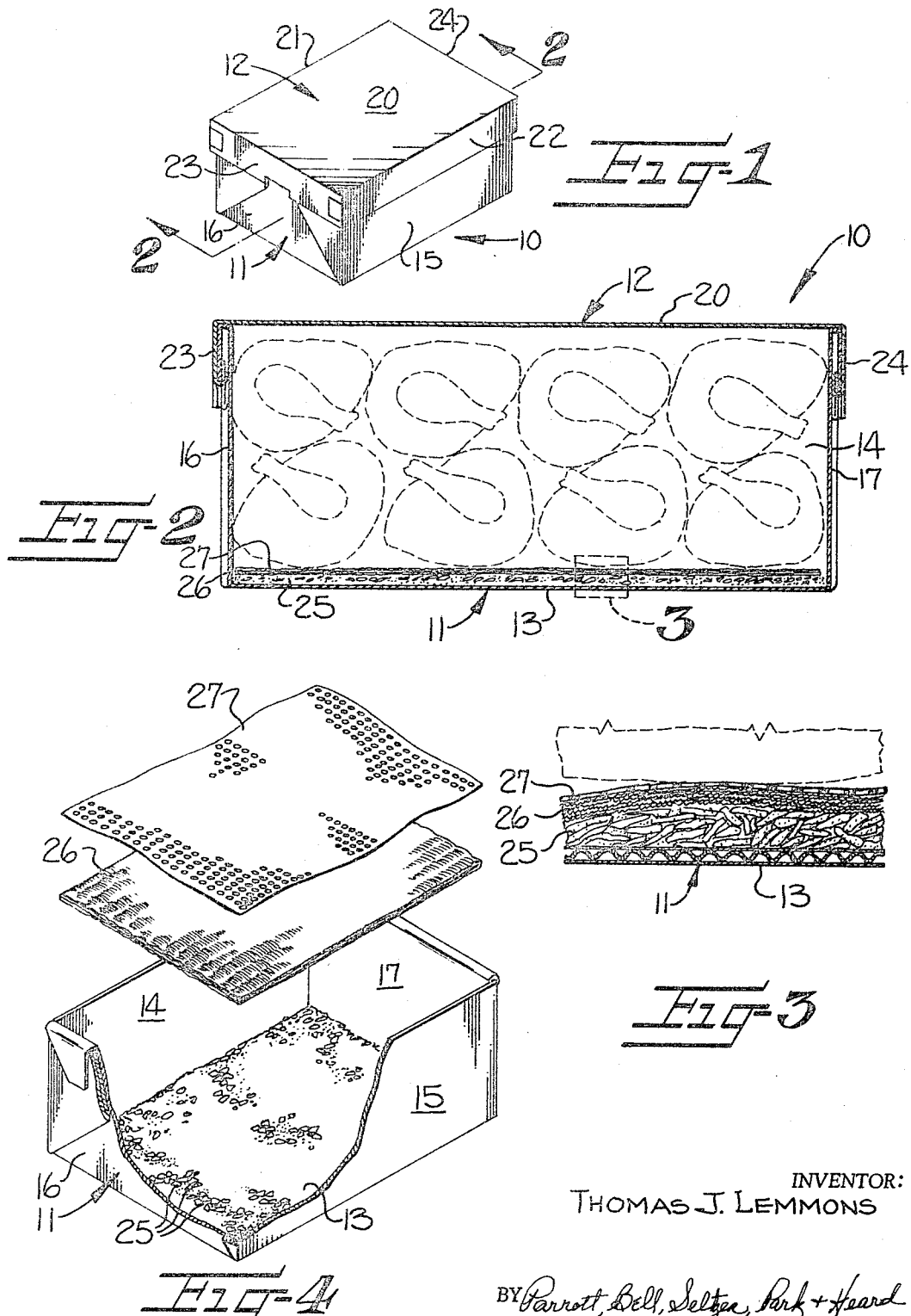

3,320,075
METHOD OF PACKAGING PRECHILLED FOOD PRODUCTS
Thomas J. Lemmons, Prairie Village, Kans., assignor to Cellu Products Company, Inc., Patterson, N.C., a corporation of North Carolina
Filed Nov. 29, 1965, Ser. No. 510,270
4 Claims. (Cl. 99—192)

The present invention relates to a food package and method of making the same and, more particularly, to an improved refrigerated package for packaging food products, such as poultry, meat products, vegetables and the like which are subject to weepage of water and/or other fluids therefrom.

Certain meat products and vegetables, particularly poultry, are conventionally packaged in a wire-bound box, which is lined with a heavy waxed paper lining. The food product is conventionally placed in the package, a substantial amount of wet ice is poured thereover, the paper lining is folded into covering relation thereto, and the top of the box is secured closed. This type of package, while maintaining the food product under refrigeration during transportation and storage thereof, has several disadvantages, foremost of which is the substantial amount of water which results from the melting of the wet ice and the effect of this water and weepage therefrom on the food product and the leakage thereof from the package. Also, the weight of the wet ice on the food product has a tendency to compress the same and adversely affect its appearance and saleability.

In an attempt to overcome the aforementioned deficiencies of this type of refrigerated package, considerable work has been done with respect to the use of corrugated paperboard boxes instead of the standard wire-bound box in view of the excellent insulation qualities thereof and therefore less ice is required and there is less water with which to contend. However, wet ice is still primarily used in such corrugated boxes and the water therefrom and weight thereof are still serious problems.

It has been proposed that a dry refrigerant, such as solid carbon dioxied or "Dry Ice," be utilized as a substitute for wet ice in packages of this type. However, there are several problems which have been encountered in the use of dry refrigerant which has heretofore resulted in either excessive moisture loss from the food product and/or unacceptable refrigeration. In this respect, the dry refrigerant has a strong tendency to cause the food product to suffer an excessive moisture loss, particularly from the surface thereof, such that when the food product is removed from the package, it has a dry, parched appearance and feel and has suffered an inordinate weight loss. All of these results are highly undesirable for obvious reasons.

In an attempt to obviate any excessive moisture loss from the food product, a paper-plastic film liner has been wrapped around the food product with the paper layer against the food product and the plastic film around the outside thereof. This paper receives the weepage, usually a mixture of blood and water in the case of poultry, and wicks the same up, around and back onto the food product so that the weepage serves as a moistening medium. It is generally well recognized that it is highly undesirable for this weepage to remain in contact with the food product due to possible discoloration, bacteria growth within the weepage and other cogent reasons.

The problem of improper cooling is due to the fact that most manufacturers utilize cardboard boxes which have been stored in an uncooled dry storage area where the temperature can reach 100° F. in the boxes. Therefore, the pre-chilled food product and dry refrigerant placed within the box must cool down the 100° F. box before any outside refrigeration can have any effect upon the food product placed therein. In this case, the insulating qualities of the corrugated cardboard box are a real disadvantage and the temperature of the food product may rise substantially before the box is cooled to the desired temperature. As the temperature fluctuates, the weepage from the food product increases and problems in the handling thereof are also increased. Also, such temperature fluctuations adversely affect shelf life and yields and result in short weights.

It is, therefore, an object of the present invention to provide a dry refrigerated container for food products which obviates the aforementioned deficiencies of prior food packages by completely eliminating wet ice and the problems encountered therewith and overcoming the difficulties encountered with previously proposed dry refrigerated packages.

A more specific object of the present invention is to provide an improved refrigerated container for food products of the type described and method of forming the same wherein temperature fluctuations of the pre-chilled product is prevented and wherein weepage from the food product is collected in spaced relation to the food product while a relatively high humidity atmosphere is maintained within the container to prevent an inordinate loss of moisture from the food product.

Some of the objects of the present invention having been stated, other objects will appear as the description proceeds when taken in connection with the accompanying drawings, in which:

FIGURE 1 is a perspective view of a food package incorporating the features of the present invention;

FIGURE 2 is a sectional view taken substantially along line 2—2 of FIGURE 1;

FIGURE 3 is an enlarged detail of the portion of the package lying substantially within the rectangle 3 in FIGURE 2; and FIGURE 4 is an exploded isometric view of the body portion of the package shown in FIGURE 1 with portions broken away for clarity.

Referring now to the drawings, there is shown in FIGURE 1 a package, generally indicated at 10, which incorporates the features of the present invention. This package includes a box of any desired construction, but preferably formed of corrugated paperboard material. This box includes a cube-shaped body portion 11 and a top or cover portion 12 which are rendered substantially water impervious by having the interior surfaces thereof coated with wax, plastic or other form of coating agent. Body portion 11 of the package 10 includes a bottom wall 13 and side walls 14, 15, 16 and 17, respectively, interconnected to form a generally leak-proof body portion. The top portion 12 includes a top wall 20 and side walls 21, 22, 23, and 24, respectively, also interconnected to form the top portion which mates with the upper portion of body portion 11 to close the same, and render the box substantially impervious or at least highly resistant to the escape of moisture therefrom to aid in maintaining a high humidity atmosphere therewithin.

In accordance with the present invention, a dry refrigerant 25, preferably in the form of finely divided particles or snow of solid carbon dioxide or "Dry Ice" is disposed within the body portion 11 on the bottom wall 13 thereof. The amount of dry refrigerant is determined by the size of the box and the amount of food product to be placed therein. For example, with a box for containing 24 chickens, one pound of dry refrigerant has been found to be sufficient to pre-chill the box to the desired temperature, and to maintain the container and food product therein at the desired temperature during the normal period of transportation into storage.

To collect weepage from the food product and overcome the drying effect of the dry refrigerant thereon, package 10 includes a pad 26 disposed in superposed, covering relation to the refrigerant 25 disposed in the bottom of the body portion 11. Pad 26 is formed of a non-toxic, absorbent material and preferably comprises a plurality of layers which are laminated together. Preferably, each of the layers comprises a sheet of cellulosic material which has been crimped or creped to substantially increase the bulk and absorptive capacity thereof, and to provide a pad which provides a cushioned support for the food product placed within the package.

A moisture permeable, generally non-absorbent spacer member 27 is disposed in superposed, covering relation to the absorbent pad 26 for supporting the food product placed within the package 10 in spaced relation to absorbent pad 26 and out of contact with the weepage collected thereby. Preferably, spacer member 27 comprises a sheet of perforated plastic material, such as polyethylene or the like, which is laminated to pad 26 so as to be secured thereto. Spacer member 27 will permit weepage from the food product disposed within the package 10 to pass downwardly therethrough into pad 26 which absorbs and collects the same away from the food product to overcome the aforementioned problems encountered when such weepage is maintained in contact with the food product. However, pad 26 and spacer member 27 permit the moisture contained within such weepage to evaporate and to pass upwardly through the spacer member 27 and form a relatively high humidity atmosphere within the package 10 to prevent an inordinate loss of moisture from the food product from the drying effect of the refrigerant 25 thereon.

The preferred method of forming package 10 will now be described. As stated above, the bottom portion 11 and cover 12 are usually set up or erected and stored in an uncooled storage area for some time so that the same are at room temperature or above prior to being used in a package 10. The method of this invention contemplates the pre-chilling of at least the body portion 11 prior to the placement of the pre-chilled food product therein to avoid the undesirable rise in temperature caused by placing the pre-chilled food product in a warm box. To effect this pre-chilling of body portion 11, the dry refrigerant 25 is placed into the body portion 11 in finely divided particle form. Due to the extreme low temperature and finely divided nature of the dry refrigerant, the body portion 11 is quickly and thoroughly pre-chilled down to a temperature closely approximating the temperature of the pre-chilled food product which is to be placed thereinto. To aid this pre-chilling of body portion 11, the open top thereof is closed at the time or immediately after the refrigerant is placed therein to confine the chilled atmosphere therewithin. More preferably, a source of liquid carbon dioxide is provided, the top of the body portion 11 is closed by a hood or similar closing device, and a predetermined amount of the liquid carbon dioxide is injected into the body portion 11 as by a predetermined time valve arrangement (not shown). The liquid carbon dioxide will immediately become expanded within the body portion 11 and form into finely divided particles or snow which will fall downwardly onto the bottom wall 13. At the same time, the atmosphere within the body portion 11 will be chilled to a very low temperature and this chilled atmosphere will aid in cooling the body portion 11 down to the temperature of the pre-chilled food product or on the order of 35° F., notwithstanding the insulating capabilities of the corrugated paperboard forming the same.

The pad 26 and spacer member 27 are then placed within the body portion 11 over the dry refrigerant 25, and the food product, such as poultry and the like, is then placed within the body portion 11 on the spacer member 27. The outer surface or skin of the food product is moistened by being sprayed with a very fine mist of water to further aid in overcoming the drying-out of the food product within the package. This very fine mist of water is just sufficient to moisten the surface of the food product and, in this respect, about one-half (½) pound of water will be added to each sixty (60) pounds of poultry. Finally, the cover portion 12 is placed over the top of the body portion 11 to complete the package 10.

It is believed apparent that a novel dry refrigerated food package and method of forming the same are provided by the present invention wherein weepage from the food product is collected and maintained in spaced relation to the food product to obviate deleterious effects on the food product therefrom, wherein temperature fluctuations of the food product within the food package are prevented, and wherein a relatively high humidity atmosphere is maintained therein to overcome the drying effect of the dry refrigerant on the food product.

In the drawings and specification there has been set forth a preferred embodiment of the invention and, although specific terms are employed, they are used in a generic and descriptive sense only and not for purposes of limitation, the scope of the invention being defined in the claims.

I claim:
1. A method of packaging and refrigerating pre-chilled food products which are subject to weepage of water and other fluids therefrom and utilizing a box having substantially imperforate body and cover portions, said method comprising:
   (a) pre-chilling the body portion of the box to a temperature approximating the temperature of the pre-chilled food product to be placed therein by disposing a predetermined amount of finely divided particles of dry refrigerant thereinto,
   (b) then positioning an absorbent pad of non-toxic absorbent material and a water permeable, generally non-absorbent spacer member within the body portion in overlying covering relation to the refrigerant in the bottom thereof and with the spacer member uppermost,
   (c) placing a pre-chilled food product within the body portion on the spacer member which supports the same in spaced relation to the absorbent pad and the refrigerant, and
   (d) then closing the body portion with the cover portion.

2. A method according claim 1 wherein the body portion is pre-chilled by injecting a predetermined amount of initially liquid carbon dioxide into the body portion which immediately solidifies into finely divided partcles.

3. A method according to claim 2 including closing the top of the body portion during the injection of the refrigerant thereinto to confine the refrigerant and chilled atmosphere within the body portion during pre-chilling thereof.

4. A method according to claim 1 including spraying the food product with a very fine mist of water prior to placing the cover in closing relation to the body portion of the box.

References Cited by the Examiner
UNITED STATES PATENTS

| | | | |
|---|---|---|---|
| 1,843,038 | 1/1932 | McIlvain | 62—372 X |
| 2,017,469 | 10/1935 | McKee et al. | 62—60 X |
| 2,278,782 | 4/1942 | Harvey et al. | 62—384 X |
| 2,289,060 | 7/1942 | Merkle | 99—192 X |
| 2,632,723 | 7/1953 | Bennett | 99—174 X |
| 2,942,429 | 6/1960 | Van Dolah et al. | 99—194 X |
| 3,026,209 | 3/1962 | Niblack et al. | 99—174 |
| 3,063,248 | 11/1962 | Morrison. | |

A. LOUIS MONACELL, *Primary Examiner.*

H. LORD, *Assistant Examiner.*